United States Patent
Yamada et al.

(10) Patent No.: US 8,955,901 B2
(45) Date of Patent: Feb. 17, 2015

(54) VEHICLE DOOR FRAME STRUCTURE AND METHOD OF PRODUCING VEHICLE DOOR FRAME

(71) Applicant: Shiroki Corporation, Kanagawa (JP)

(72) Inventors: Makoto Yamada, Kanagawa (JP); Jun Makita, Kanagawa (JP)

(73) Assignee: Shiroki Corporation, Fujisawa-shi, Kanagawa (JP)

( * ) Notice: Subject to any disclaimer, the term of this patent is extended or adjusted under 35 U.S.C. 154(b) by 0 days.

(21) Appl. No.: 14/065,689

(22) Filed: Oct. 29, 2013

(65) Prior Publication Data

US 2014/0117707 A1    May 1, 2014

(30) Foreign Application Priority Data

Oct. 30, 2012   (JP) .................. 2012-238446

(51) Int. Cl.
*B60J 5/04*  (2006.01)
*B21D 19/08*  (2006.01)

(52) U.S. Cl.
CPC .............. *B21D 19/08* (2013.01); *B60J 5/0402* (2013.01); *B60J 5/0469* (2013.01)
USPC .......................................... 296/146.9; 49/502

(58) Field of Classification Search
USPC .................... 296/146.2, 146.5, 146.9; 49/502
IPC ........................................................... B60J 5/04
See application file for complete search history.

(56) References Cited

FOREIGN PATENT DOCUMENTS

| JP | 11-263126 A | 9/1999 |
|---|---|---|
| JP | 2003-211963 A | 7/2003 |

OTHER PUBLICATIONS

Patent Abstracts of Japan for JP 11-263126.
Patent Abstracts of Japan for JP 2003-211963.

*Primary Examiner* — Pinel Romain
(74) *Attorney, Agent, or Firm* — Millen, White, Zelano, Branigan, P.C.

(57) ABSTRACT

In a vehicle door frame structure including a sheet-metal member of a vehicle door frame, the sheet-metal member formed by a metal sheet includes a folded edge at an edge of the metal sheet, wherein an end of the folded edge is in noncontact with a remaining part of the metal sheet. The folded edge has an inclined shape which is inclined to increase a distance between the folded edge and the remaining part of the metal sheet in a direction from a bend of the folded edge to a free end of the folded edge.

7 Claims, 5 Drawing Sheets

VEHICLE DOOR FRAME STRUCTURE AND METHOD OF PRODUCING VEHICLE DOOR FRAME

BACKGROUND OF THE INVENTION

1. Field of the Invention

The present invention relates to the structure of a vehicle door frame in which hemming (empty hemming) is formed at an edge of a metal sheet and also relates to a method of producing such a door frame.

2. Description of Related Art

In vehicle door frames (door sashes), regardless of press-molded products or roll-formed products, sometimes hemming (empty hemming/press working), in which an edge of a single metal sheet is folded back, is performed instead of seaming, in which two metal (iron-based or aluminum-alloyed) sheets are joined. Typically, hemming is performed on the edge (vertical edge) of a design portion of a vertical pillar sash on the vehicle exterior side thereof. Principal purposes of hemming are to improve the outward appearance of the edge of a metal sheet and prevent this edge from rusting, and conventional hemming consists of an essential three-step process: down-flanging (90-degree bending), prehemming and rope-hemming. The first bending step (down-flanging) bends the edge of a metal sheet to substantially 90 degrees. The second bending step (prehemming) further bends the edge by approximately an additional 45 degrees (i.e., approximately 135 degrees with respect to the metal sheet before the first bending step), and the final step (rope-hemming) folds the edge back (by approximately 180 degrees with respect to the metal sheet before the first bending step) onto the major part of the metal sheet (the remainder of the metal sheet) while leaving an arc-shaped cross sectional portion (space/clearance/air pocket) in the folded edge. Rope-hemming is sometimes replaced by flat-hemming (0-degree (180-degree) bending) that folds the edge so as to completely lie on the major part of the metal sheet (the remainder of the metal sheet). A sealer (waterproofing agent) is usually applied to the door frame edge on which hemming has been performed to prevent the edge from rusting. In this specification, "hemming" (empty hemming) is defined as press-working an edge of a single metal sheet by folding the edge back without sandwiching any other metal sheet therebetween, whereas "seaming" is defined as press-working to join a first metal sheet with a second metal sheet by sandwiching the second metal sheet between the first metal sheet and the folded-back edge of the first metal sheet.

Conventional hemming consists of an essential three-step process: down-flanging, prehemming and rope-hemming (or flat-hemming) as described above, which has been common technical knowledge in the related art.

SUMMARY OF THE INVENTION

The present invention has been made by reviewing the above-described common technical knowledge and provides a vehicle door frame structure and a method of producing a vehicle door frame each of which makes it possible to simplify the manufacturing process of a vehicle door frame having one or more hems (empty hems).

Inventors of the present invention have achieved the present invention after reaching the conclusion that the reason why prehemming and rope-hemming (or flat-hemming) have been considered essential after down-flanging was because it was believed that it was necessary for the end (free end) of the folded edge to be brought into contact with the major part of the metal sheet (the remainder of the metal sheet), and that it is possible to sufficiently accomplish the above-described principal purpose of hemming (to improve the outward appearance of an edge of a metal sheet and prevent this edge from rusting) without needing to bring the free end of the folded edge into contact with the major part of the metal sheet.

According to an aspect of the present invention, a vehicle door frame structure is provided, including a sheet-metal member of a vehicle door frame, the sheet-metal member formed by a metal sheet including a folded edge at an edge of the metal sheet, wherein an end of the folded edge is in noncontact with a remaining part of the metal sheet. The folded edge has an inclined shape which is inclined to increase a distance between the folded edge and the remaining part of the metal sheet in a direction from a bend of the folded edge to a free end of the folded edge.

It is desirable for the sheet-metal member to include a vertical pillar sash of a door sash of the vehicle door frame, and for the folded edge to be formed at a vertical edge of a design portion of the vertical pillar sash on a vehicle exterior side thereof.

It is desirable for a waterproof agent to be applied between the end of the folded edge and the remaining part of the metal sheet.

It is desirable for an opening angle of the folded edge relative to the remaining part of the metal sheet is less than 25 degrees.

This opening angle can be the maximum possible bending angle of the folded edge (in other words, the minimum angle of the folded edge relative to the major part of the metal sheet) by a single bending operation (partial hemming/incomplete hemming) that is performed after down-flanging is performed on the metal sheet.

If the opening angle is greater than or equal to 25 degrees, there is a possibility of workability deteriorating when a sealer is applied to the folded edge in the manufacturing process of the door sash. Accordingly, it is not desirable that the opening angle be greater than or equal to than 25 degrees.

It is practical for a width of the metal sheet to progressively vary.

It is desirable for the metal sheet to be press-worked to form the sheet-metal member, together with the folded edge.

According to another aspect of the present invention, a method of producing a vehicle door frame is provided, including a sheet-metal member, which is formed by a metal sheet in which a folded edge is formed at an edge of the metal sheet, the method including down-flanging the edge of the metal sheet to form a bent edge, and partially hemming the bent edge of the metal sheet. The partially hemming of the bent edge of the metal sheet is performed in a single operation so that the folded edge is angled relative to a remaining part of the metal sheet so that a distance between the folded edge and the remaining part of the metal sheet increases with respect to a direction from a bend of the folded edge to a free end of the folded edge.

The method of producing a vehicle door frame according to the present invention forms the folded edge by only carrying out a two-step process: down-flanging and partial hemming (incomplete hemming).

It is desirable that a waterproof agent (sealer) be applied between the end of the folded edge, on which partial hemming has been performed, and the major part of the metal sheet.

The vehicle door frame structure according to the present invention can be applied to at least an edge of a design portion of a vertical pillar sash of a door sash.

According to the present invention, in the vehicle door frame structure, the conventional three-step process for forming a folded edge at an edge of a metal sheet can be reduced to a two-step process. This contributes to a significant cost reduction at the production site.

The present disclosure relates to subject matter contained in Japanese Patent Application No. 2012-238446 (filed on Oct. 30, 2012) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
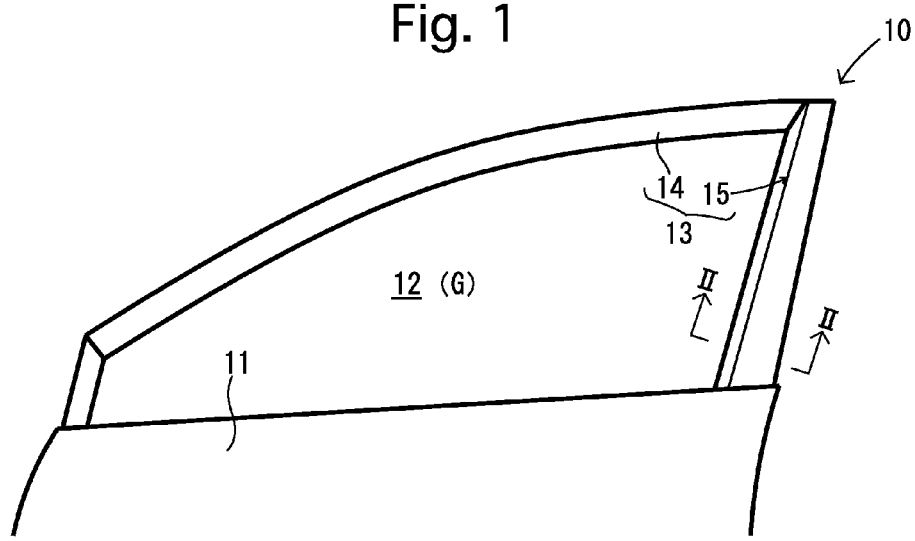
FIG. 1 is a side elevational view of a motor-vehicle side door to which a vehicle door frame structure according to the present invention is applied.

FIG. 1 shows, by way of example, a side elevational view of a motor-vehicle front door (front-left side door) 10, to which the vehicle door frame structure according to the present invention is applied. Note that a lower half of the front door 10 is not shown in FIG. 1. The front door 10 is provided with a door body (an inner panel and an outer panel) 11 and a door sash (window frame) 13 which forms a window opening 12 immediately above the door body 11.

The door sash 13 is provided with a curved upper sash 14 which receives the upper edge of a window pane G and a vertical pillar sash (sheet-metal member) 15 which extends along the associated (left) center pillar of a vehicle body (not shown) and receives the vertical edge of the window pane G.

Figure 2:
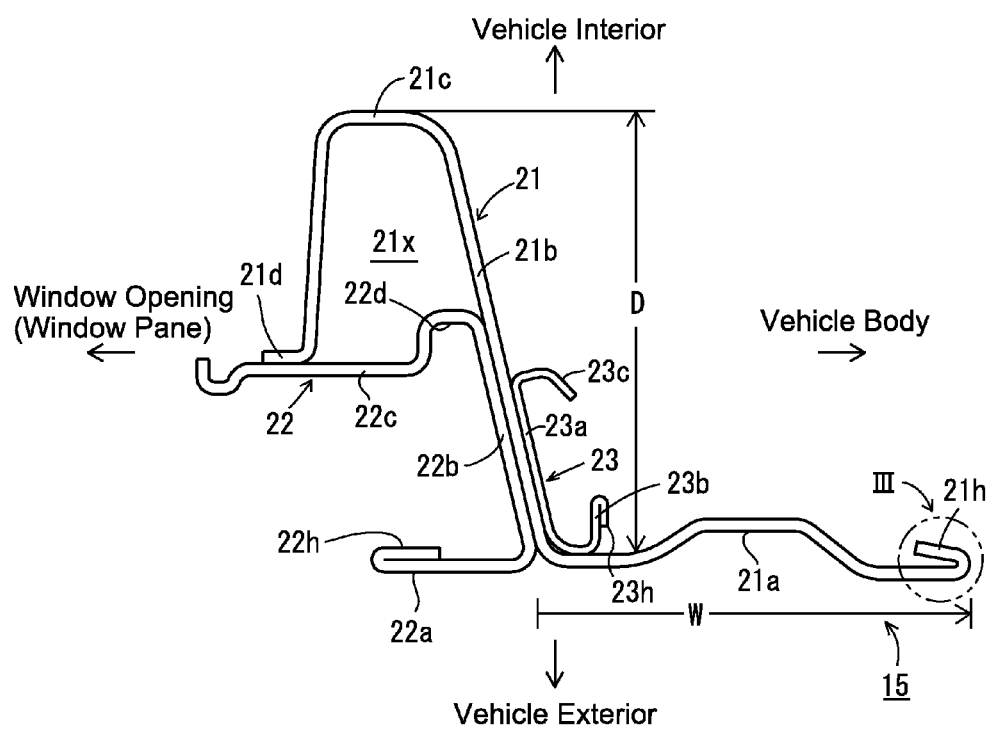
FIG. 2 is an illustration made by overlaying sections (sections at different positions in the vertical direction) taken along or parallel to the line II-II shown in FIG. 1, showing an embodiment of the vehicle door frame structure according to the present invention.

The vertical pillar sash 15 of the prevent embodiment of the motor-vehicle front door 10 is made of a plurality of iron-based materials (metal sheets) which are joined together. Specifically, the vertical pillar sash 15 is provided with a main sash member 21, a sub-sash member (weather strip retaining member) 22 and a weather strip retaining member 23 as shown in FIG. 2. The vehicle exterior side, the vehicle interior side, the vehicle body side and the window opening side (window pane side) are defined as shown in FIG. 2. Each of the sub-sash member 22 and the weather strip retaining member 23 is uniform in cross section and is formed by roll-forming (or can be formed by press-forming).

The main sash member 21 is provided with a design portion 21a, a connecting portion 21b and a box-channel forming portion 21c. The design portion 21a is positioned on the vehicle exterior side, the connecting portion 21b is formed by bending the end of the design portion 21a on the window-opening side toward the vehicle interior side, and the box-channel forming portion 21c is formed by bending the end of the connecting portion 21b on the vehicle-interior side firstly toward the window-pane side and subsequently toward the vehicle exterior side. The width W of the design portion 21a of the main sash member 21 varies (progressively varies) in the vertical direction (progressively increases in the downward direction). In addition, the length (width) D of the connecting portion 21b toward the vehicle interior side also varies in the vertical direction (increases in the downward direction), and the shape of the box-channel forming portion 21c also varies in accordance with variation in length (width) of the connecting portion 21b. The main sash member 21 is formed by press-forming.

The sub-sash member 22 is provided with a design portion 22a, a connecting portion (base wall) 22b and a glass run retaining portion 22c. The design portion 22a is positioned on the vehicle exterior side, the connecting portion 22b extends along the connecting portion 21b and is formed by bending the vehicle-body side end of the design portion 22a toward the vehicle interior side, and the glass run retaining portion 22c is formed by bending the vehicle-interior side end of the connecting portion 22b toward the window opening side. The glass run retaining portion 22c is provided with a stepped retaining portion 22d. The glass run retaining portion 22c is positioned on the vehicle exterior side of the box-channel forming portion 21c of the main sash member 21.

The weather strip retaining member 23 is provided with a base wall 23a which extends along the connecting portion 21b, and two retaining edges 23b and 23c which are formed by bending the vehicle-exterior side end and the vehicle-interior side end of the base wall 23a inwardly toward each other.

The main sash member 21, the sub-sash member 22 and the weather strip retaining member 23 are joined together by spot-welding the connecting portion 21b, the connecting portion 22b and the base wall 23a together. In addition, the main sash member 21 is provided at the vehicle-exterior side edge of the box-channel forming portion 21c with a welded wall 21d which is overlaid onto and welded to the window-opening side edge of the glass run retaining portion 22c of the sub-sash member 22, and the box-channel forming portion 21c and the glass run retaining portion 22c form a box channel portion 21x. The volume of the box channel portion 21x increases in a downward direction in accordance with variation in length of the connecting portion 21b and the box-channel forming portion 21c toward the vehicle interior side.

A known glass run (not shown) is held in the space formed by the design portion 22a, the connecting portion 22b and the glass run retaining portion 22c of the sub-sash member 22, and a known weather strip (not shown) is held by the weather strip retaining member 23. The glass run is in sliding contact with the vertical edge of the window pane G that moves up and down in the window opening 12, and the weather strip comes into contact with a vehicle body and is elastically deformed when the front door 10 is closed. A vehicle-body side weather strip (not shown) which is pressed and elastically deformed by the box-channel forming portion 21c (the box channel portion 21x) is installed onto the vehicle body.

In the vertical pillar sash 15 that has the above described structure, hemming has been performed on the vehicle-body side edge (the right edge with respect to FIG. 2) of the design portion 21a of the main sash member 21, the window-opening side edge (the left edge with respect to FIG. 2) of the design portion 22a of the sub-sash member 22 and the edge of the retaining edge 23b, of the weather strip retaining member 23, that faces the vehicle interior side. Out of these edges, the hemming formed on the design portion 22a is a hemming in which an edge of the design portion 22a is folded over inwardly (toward the vehicle interior side) onto itself (i.e., folded by 180 degrees) by roll-forming so that a hem (folded edge) 22h lies on a remaining part of the metal sheet of the sub-sash member 22, and the hemming on the retaining edge 23b is a hemming in which an edge of the retaining edge 23b is folded over outwardly (toward the vehicle exterior side) onto itself (i.e., folded by 180 degrees) by roll-forming so that a hem (folded edge) 23h lies on a remaining part of the metal sheet of the weather strip retaining member 23. The number of processes is not big problem when hemming is performed by roll-forming.

Figure 3:
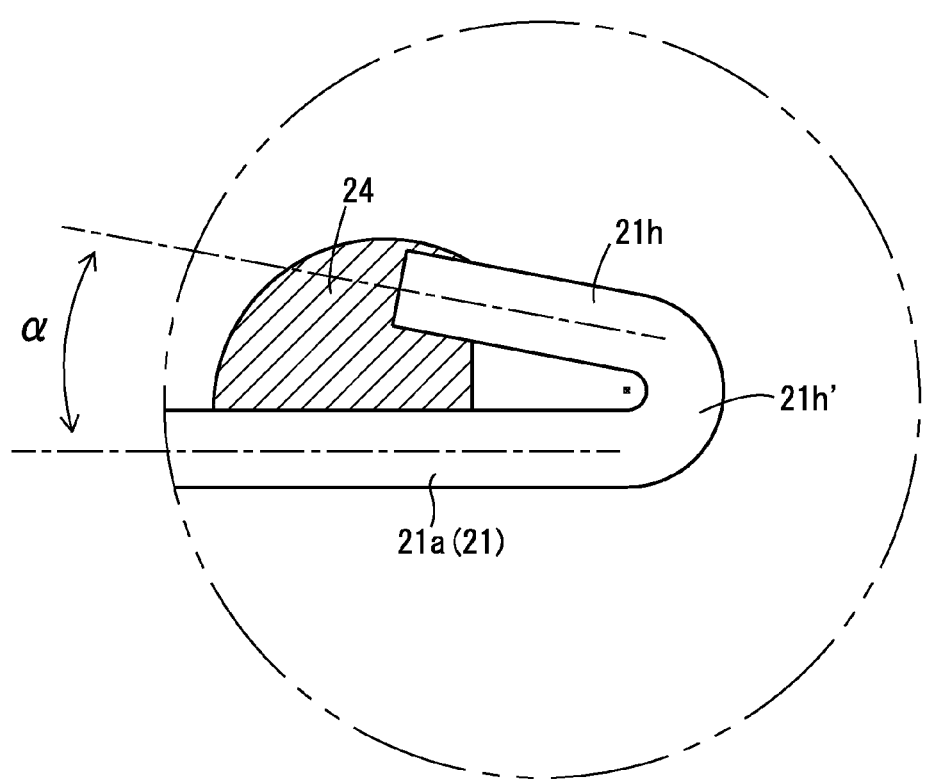
FIG. 3 is an enlarged cross sectional view of a portion of a main sash member which is circled by a two-dot chain line III in FIG. 2.

On the other hand, the vertical edge (the right edge with respect to FIG. 2) of the design portion 21a of the main sash member 21 that is produced by press working is formed by partial hemming in which the end (free end) of a folded edge 21h of the design portion 21a is in noncontact with a remaining part of the metal sheet of the design portion 21a as shown by an enlarged view in FIG. 3. The folded edge 21h has an inclined shape which is inclined to progressively increase the distance between the folded edge 21h and the remainder of the metal sheet of the design portion 21a in a direction from a bend 21h' to the free end of the folded edge 21h, and an opening angle $\alpha$ of the folded edge 21h relative to the remainder of the metal sheet of the design portion 21a is set at an angle of 20±5 degrees. This opening angle $\alpha$ is set smaller than 25 degrees. If the opening angle $\alpha$ is greater than or equal to 25 degrees, there is a possibility of the workability deteriorating when a sealer is applied to the end of the folded edge 21h in the manufacturing process of the door sash 13. If the opening angle $\alpha$ is smaller than 15 degrees, it is difficult to form the folded edge 21h by a two-step press working process (i.e., a down-flanging step and the subsequent single partial hemming step).

Figure 4A:
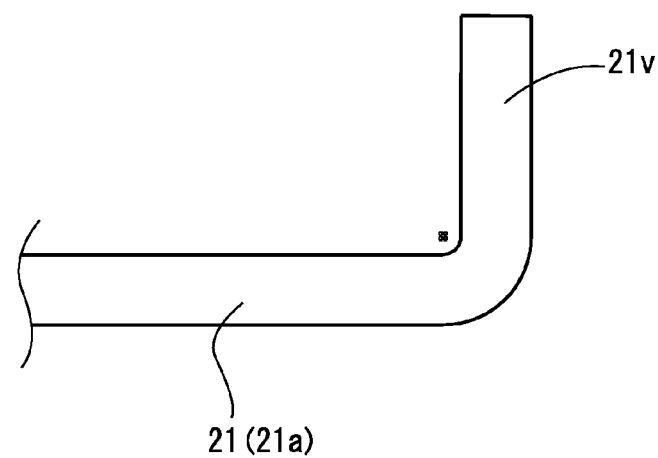
FIGS. 4A and 4B show a process diagram illustrating an embodiment of a method of producing a vehicle door frame according to the present invention.
Figure 4B:
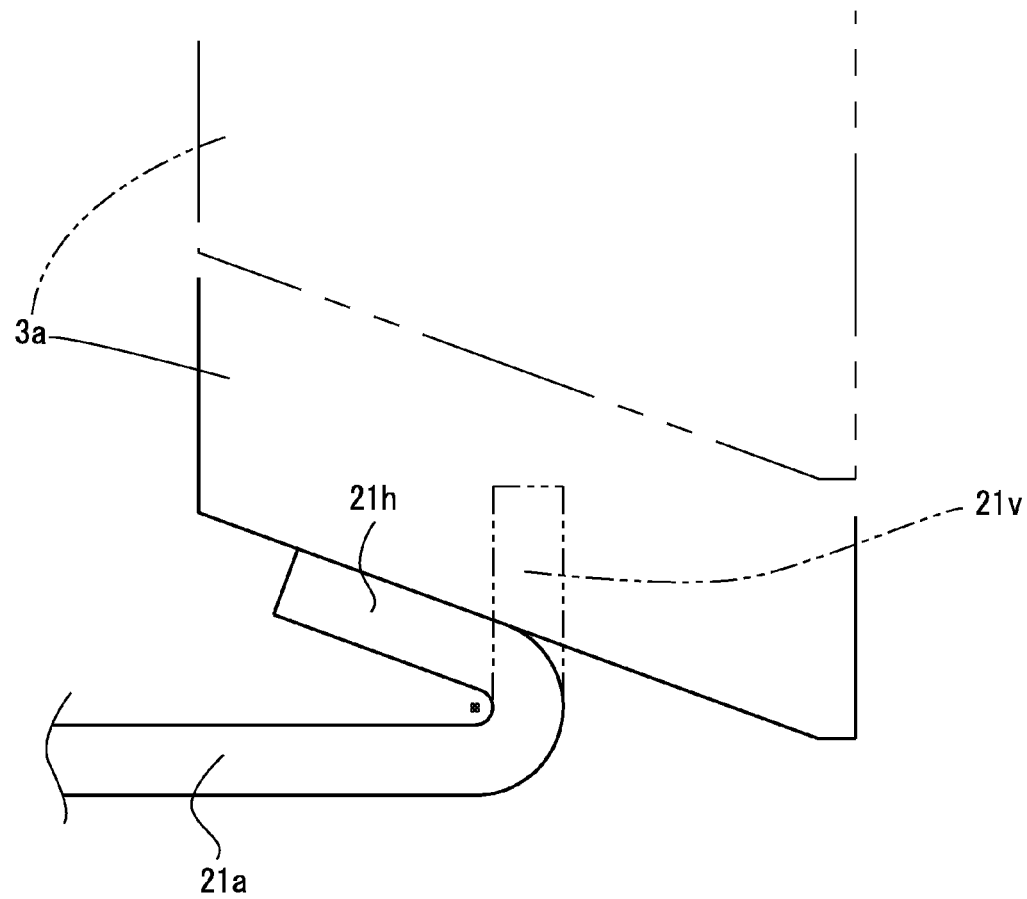

FIGS. 4A and 4B show a process of forming the folded edge 21h by partially hemming the end of the design portion 21a by press-working. FIG. 4A shows the down-flanging step and FIG. 4B shows the partial hemming step. In the down-flanging step shown in FIG. 4A, the edge of the design portion 21a of the main sash member 21 after it is formed is bent to an approximately right angle (90 degrees) to form a right-angle bent edge 21v. Subsequently, in the partial hemming step shown in FIG. 4B, with the design portion 21a fixed, the right-angle bent edge 21v is folded inwardly to an approximately 20 degrees with a punch (tool) 3a.

As described above, one press working step (rope-hemming/flattening step) has been omitted by forming the folded edge 21h, the end (free end) of which is in noncontact with the remainder of the metal sheet of the design portion 21a, by a two-step process consisting of a down-flanging step and an partial hemming step, which can contribute to cost reduction. A sealer (waterproofing agent) 24 is applied (filled in) between the end of the folded edge 21h and the design portion 21a as a post-process for the purpose of waterproofing and rustproofing. Since the width W of the design portion 21a of the main sash member 21 progressively varies, roll-forming is unsuitable for forming the main sash member 21, and it is practical for the main sash member 21 to be formed by press-forming. In other words, if the main sash member 21 is formed by press-forming, the folded edge 21h can be formed by the above described two-step process.

Although the vertical pillar sash 15 of the above described embodiment of the motor-vehicle front door 10 is configured of three members: the main sash member 21, the sub-sash member 22 and the weather strip retaining member 23, it is possible for the vertical pillar sash 15 to be configured of two or more than three members.

Figure 5:
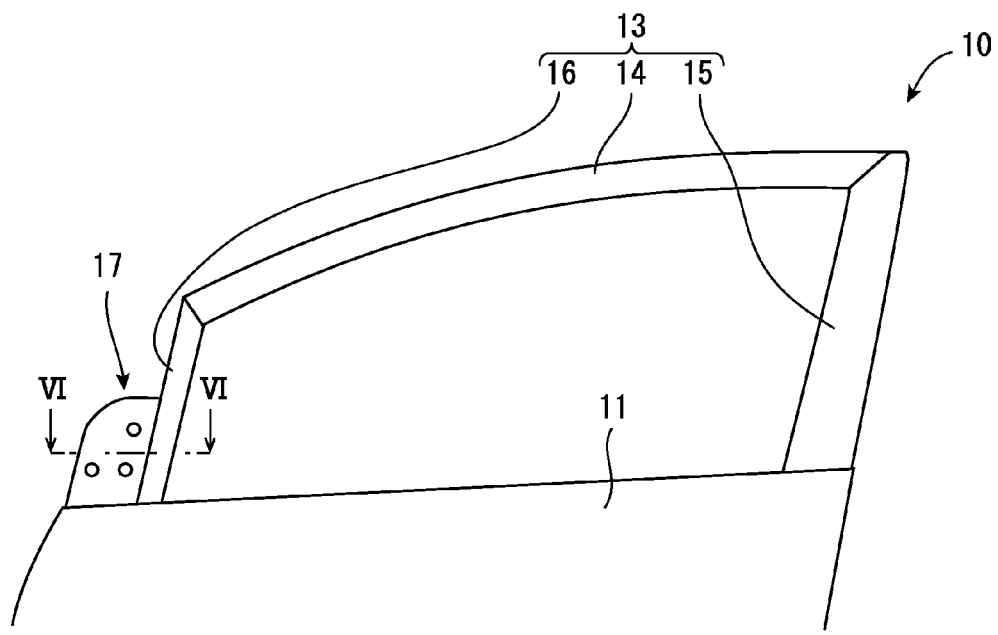
FIG. 5 is a side elevational view of a motor-vehicle side door having a mirror-mounting bracket to which a vehicle door frame structure according to the present invention is applied.
Figure 6:
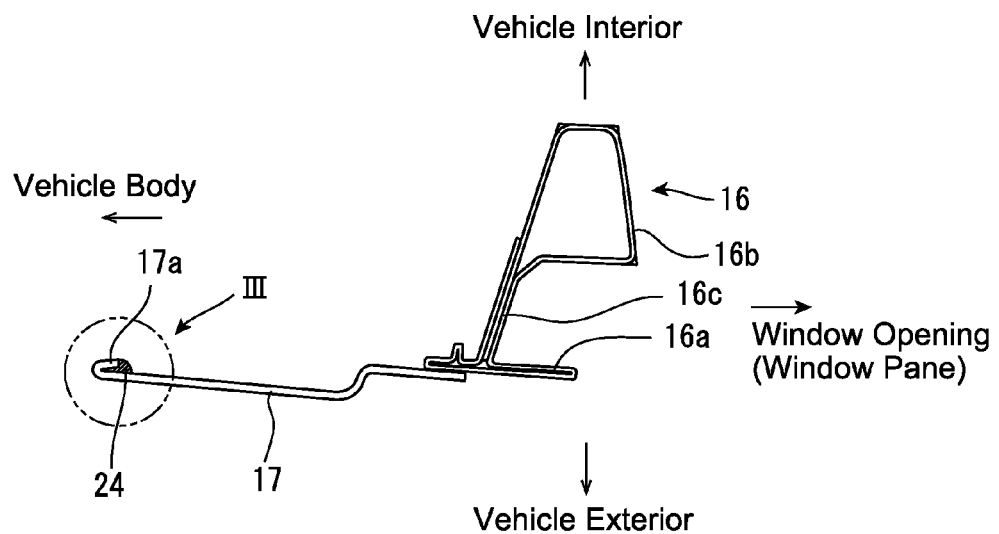
FIG. 6 is a cross sectional view taken along the line VI-VI shown in FIG. 5.

FIGS. 5 and 6 show another embodiment of the vehicle door frame structure according to the present invention, wherein the vehicle door frame structure according to the present invention has been applied to a mirror-mounting bracket (sheet-metal member) 17 of the front door 10. The door sash 13 of the front door 10 is provided with a front pillar 16 positioned in front of an upper sash 14 and a vertical pillar sash 15 positioned behind the upper sash 14, and the mirror-mounting bracket 17 that is made of a metal sheet is welded to the front pillar 16 to be fixed thereto. More specifically, the front pillar 16 is a roll-formed product having a uniform cross-section and provided with a design portion 16a, a box channel portion 16b and a connecting portion 16c. The design portion 16a is positioned on the vehicle exterior side, the box channel portion 16b is positioned on the vehicle interior side, the connecting portion 16c connects the design portion 16a and the box channel portion 16b, and the mirror-mounting bracket 17 is welded to the front (vehicle-body side) of end (the left end with respect to FIG. 6) of the design portion 16a at the vehicle-body side. The mirror-mounting bracket 17 is press-formed and provided, at the vertical edge thereof on the vehicle-body side (the left side with respect to FIG. 6), with a folded edge 17a that is folded toward the vehicle interior side. Similar to the folded edge 21h of the previous embodiment of the vehicle door frame structure, the folded edge 17a is in noncontact with the remainder of the main sheet of the mirror-mounting bracket 17 and has an inclined shape which is inclined to increase the distance between the folded edge 17a and the remainder of the main sheet of the mirror-mounting bracket 17 in a direction toward the free end of the folded edge 17a. Similar to the folded edge 21h, a sealer (waterproofing agent) 24 is applied (filled in) between the end of the folded edge 17a and the remainder of the main sheet of the mirror-mounting bracket 17 as a post-process for the purpose of waterproofing and rustproofing. Accordingly, an enlarged shape of the portion circled by a two-dot chain line III in FIG. 6 is substantially identical to that shown in FIG. 3. A door mirror (not shown) is fixed to the mirror-mounting bracket 17. Accordingly, not only can the present invention be applied to a vertical pillar sash, but also another metal sheet which constitutes an element of a vehicle door frame.

Figure 7A:
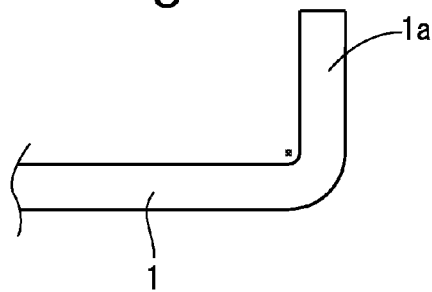
FIGS. 7A, 7B and 7C show a process diagram illustrating the process of forming a Kara-hem of a conventional vehicle door frame structure.
Figure 7B:
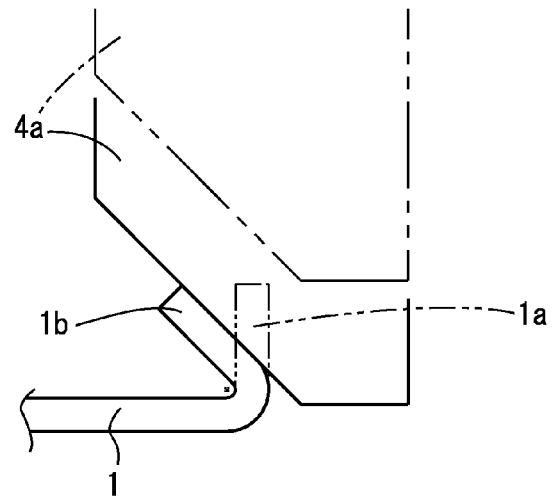
Figure 7C:
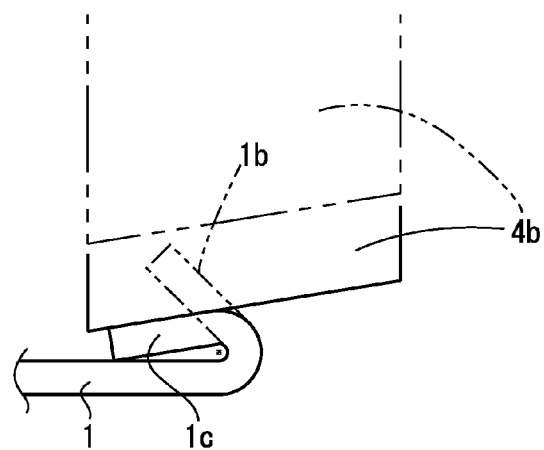

FIGS. 7A, 7B and 7C show an overview of a conventional hemming; FIG. 7A shows a down-flanging step, FIG. 7B shows a prehemming step and FIG. 7C shows a rope-hemming step. The down-flanging step shown in FIG. 7A is identical to that shown in FIG. 4A. Namely, in the down-flanging step shown in FIG. 7A, an edge of a metal sheet 1 is bent to an approximately right angle (90 degrees) to form a right-angled edge 1a. The subsequent prehemming step shown in FIG. 7B is a step for bending the edge 1a further inwardly to an approximately 135 degrees to form an inclined edge 1b with a flattening punch (flattening tool) 4a. The subsequent rope-hemming step shown in FIG. 7C is a step for bending the edge 1b further inwardly to form a folded edge 1c with a flattening punch (flattening tool) 4b with the metal sheet 1 fixed until the free end thereof comes into contact with a remaining part of the metal sheet (main sheet) 1. In this manner, conventional hemming requires three working steps.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A vehicle door frame structure including a sheet-metal member of a vehicle door frame, said sheet-metal member formed by a metal sheet comprising:
    a folded edge at an edge of said metal sheet,
    wherein an end of said folded edge is in noncontact with a remaining part of said metal sheet, and
    wherein said folded edge has an inclined shape which is inclined to increase a distance between said folded edge and said remaining part of said metal sheet in a direction from a bend of said folded edge to a free end of said folded edge.

2. The vehicle door frame structure according to claim 1, wherein said sheet-metal member comprises a vertical pillar sash of a door sash of said vehicle door frame, and
    wherein said folded edge is formed at a vertical edge of a design portion of said vertical pillar sash on a vehicle exterior side thereof.

3. The vehicle door frame structure according to claim 1, wherein a waterproof agent is applied between said end of said folded edge and said remaining part of said metal sheet.

4. The vehicle door frame structure according to claim 1, wherein an opening angle of said folded edge relative to said remaining part of said metal sheet is less than 25 degrees.

5. The vehicle door frame structure according to claim 1, wherein a width of said metal sheet varies progressively.

6. The vehicle door frame structure according to claim 1, wherein said metal sheet is press-worked to form said sheet-metal member, together with said folded edge.

7. A method of producing a vehicle door frame including a sheet-metal member, which is formed by a metal sheet in which a folded edge is formed at an edge of said metal sheet, said method comprising:
    down-flanging said edge of said metal sheet to form a bent edge, and
    partially hemming said bent edge of said metal sheet,
    wherein said partially hemming of said bent edge of said metal sheet is performed in a single operation so that said folded edge is angled relative to a remaining part of said metal sheet so that a distance between said folded edge and said remaining part of said metal sheet increases with respect to a direction from a bend of said folded edge to a free end of said folded edge.

* * * * *